US012737760B2

(12) United States Patent
Humpherys et al.

(10) Patent No.: US 12,737,760 B2
(45) Date of Patent: Sep. 15, 2026

(54) USING GENERATIVE ARTIFICIAL INTELLIGENCE FOR AUTOMATED ANALYSIS OF SMART CONTRACTS ON BLOCKCHAIN

(71) Applicant: ADOBE INC., San Jose, CA (US)

(72) Inventors: David Humpherys, Lehi, UT (US); Jonathan Lancar, Sunny Isles, FL (US)

(73) Assignee: ADOBE INC., San Jose, CA (US)

( * ) Notice: Subject to any disclaimer, the term of this patent is extended or adjusted under 35 U.S.C. 154(b) by 5 days.

(21) Appl. No.: 18/458,856

(22) Filed: Aug. 30, 2023

(65) Prior Publication Data

US 2025/0078074 A1 Mar. 6, 2025

(51) Int. Cl.
*G06Q 20/40* (2012.01)
*G06Q 20/38* (2012.01)

(52) U.S. Cl.
CPC ......... *G06Q 20/401* (2013.01); *G06Q 20/389* (2013.01)

(58) Field of Classification Search
CPC .... G06Q 20/401; G06Q 20/389; G06Q 50/18; G06N 20/00
See application file for complete search history.

(56) References Cited

U.S. PATENT DOCUMENTS

| | | | |
|---|---|---|---|
| 8,332,290 B1 | 12/2012 | Venturo et al. | |
| 2017/0286987 A1 | 10/2017 | Carter et al. | |
| 2017/0289223 A1 | 10/2017 | Kipp et al. | |
| 2019/0325473 A1 | 10/2019 | Swamidurai | |
| 2020/0328890 A1 | 10/2020 | Connor | |
| 2022/0045849 A1 | 2/2022 | Jing et al. | |
| 2022/0051279 A1 | 2/2022 | Czajka et al. | |
| 2022/0292268 A1* | 9/2022 | Shillingford | G06F 16/313 |
| 2022/0351192 A1 | 11/2022 | Mcgregor et al. | |
| 2022/0385477 A1 | 12/2022 | Kravitz et al. | |
| 2023/0111668 A1 | 4/2023 | Metnick et al. | |
| 2023/0129576 A1* | 4/2023 | Root | G06Q 20/389 705/39 |

(Continued)

FOREIGN PATENT DOCUMENTS

| | | | |
|---|---|---|---|
| CN | 107491964 A | 12/2017 | |
| CN | 114817932 * | 7/2022 | G06F 21/577 |
| CN | 114817932 A * | 7/2022 | G06N 3/047 |
| CN | 116662991 A * | 8/2023 | G06F 21/563 |
| EP | 3933637 A1 * | 1/2022 | H04L 9/50 |

OTHER PUBLICATIONS

Huong et al.: False alarm reduction method for waekness static analysis using BERT Model, 2023, Applied Science 13.6:3502, pp. 1-10 (Year: 2023).*

(Continued)

*Primary Examiner* — Bijendra K Shrestha
(74) *Attorney, Agent, or Firm* — Shook, Hardy & Bacon L.L.P.

(57) ABSTRACT

Methods and systems are provided for using generative AI for automated analysis of smart contracts on blockchain. In embodiments described herein, smart contract code for a smart contract is accessed in blockchain via a retriever component. The smart contract code includes a condition of the smart contract in a programming language format. A language model generates natural language content based on the smart contract code. The natural language content is then displayed.

15 Claims, 7 Drawing Sheets

(56) References Cited

U.S. PATENT DOCUMENTS

| | | | | |
|---|---|---|---|---|
| 2023/0244938 | A1* | 8/2023 | Wei | G06N 3/045 706/25 |
| 2023/0297345 | A1 | 9/2023 | Khalfan et al. | |
| 2023/0306427 | A1 | 9/2023 | Unagami et al. | |
| 2023/0351464 | A1 | 11/2023 | Beausoleil | |
| 2023/0360329 | A1 | 11/2023 | Esquivel et al. | |
| 2024/0013199 | A1 | 1/2024 | Marshall et al. | |
| 2024/0086918 | A1 | 3/2024 | Gisolfi et al. | |
| 2024/0185209 | A1 | 6/2024 | Skipper et al. | |
| 2024/0330605 | A1* | 10/2024 | Hunn | H04L 9/3247 |
| 2024/0330927 | A1* | 10/2024 | Abdelrahman | G06F 8/35 |
| 2024/0394705 | A1* | 11/2024 | Abdelrahman | G06Q 20/389 |
| 2025/0156828 | A1 | 5/2025 | Sliwka et al. | |

OTHER PUBLICATIONS

Napoli et al.: Evaluating ChatGPT for Smart Contracts Vulnerability Correction, 2023, 47th Annual Computing Software, and Applications Conference (COMPPSAC), pp. 1828-1833 (Year: 2023).*

Dubey et al.: Confluence of Artificial Intelligence and Blockchain Powered Smart Contract in Finance, 2022, International Conference on Computing, Communication and Intellignce Systems (ICCCIS), pp. 125-130. (Year: 2022).*

Kushwaha et al.: Ehtereum Smart Contract Analysis Tools: A Systematic Review, Mar. 29, 2022, Data Object Identifier, pp. 57037-57062 (Year: 2022).*

Dubey et al.: Confluence of Artificial Intelligence and Blockchain Powered Smart Contract in Finance System, 2022, IEEE, pp. 125-130 (Year: 2022).*

Coinbase, Why Digital Signatures are essential for blockchains, [online], published on Jan. 26, 2022, available at: < https://www.coinbase.com/developer-platform/discover/dev-foundations/digital-signatures >.

Non-Final Office Action received for U.S. Appl. No. 18/467,695, mailed on May 8, 2025, 23 pages.

Non-Final Office Action received for U.S. Appl. No. 18/530,619, mailed on May 29, 2025, 36 pages.

Final Office Action received for U.S. Appl. No. 18/530,619, mailed on Nov. 19, 2025, 54 pages.

Non-Final Office Action received for U.S. Appl. No. 18/530,619, mailed on Mar. 23, 2026, 74 pages.

* cited by examiner

USING GENERATIVE ARTIFICIAL INTELLIGENCE FOR AUTOMATED ANALYSIS OF SMART CONTRACTS ON BLOCKCHAIN

BACKGROUND

Blockchain platforms offer a trustless transaction environment where smart contracts are transparent and secured by a blockchain consensus mechanism. Notwithstanding, most consumers do not understand the language of these contracts as smart contracts on blockchain are code written to execute functions rather than inform consumers about legal rights. Further, many industry participants in smart contracts have limited knowledge regarding blockchain and/or contracts in general, which often results in missing or substandard contractual terms within the smart contracts. Even further, smart contract code may refer to code that resides outside the domain of the blockchain's governance. In this regard, off-chain contractual dependencies (e.g., outside the domain of the blockchain platform implementing the smart contract) may not be transparent from the code of the smart contract even to programmers that understand the smart contract code.

SUMMARY

Various aspects of the technology described herein are generally directed to systems, methods, and computer storage media for, among other things, using generative artificial intelligence (AI) for automated analysis of smart contracts on blockchain. In this regard, embodiments described herein facilitate using generative AI for automated analysis of smart contracts on blockchain by utilizing a language model trained to generate natural language content based on smart contract code. When a user, such as a business, selects a smart contract to analyze, the code of the smart contract can be retrieved from the blockchain to generate natural language content based on the code of the smart contract using the language model. The generated natural language content based on the code of the smart contract can include a summary of the smart contract, itemizations of each condition of the smart contract, missing contract terms based on other smart contracts, warnings related to off-chain conditions, and suggested contract language based on the smart contract code. In this regard, the generated natural language content can be utilized to generate written contracts based on the smart contract code and/or provide standardized disclosures regarding the smart contract to the business and/or customers. Further, fine-tuning processes may be utilized to fine-tune the language model based on client-specific and/or subject-matter specific data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Overview

Figure 1:
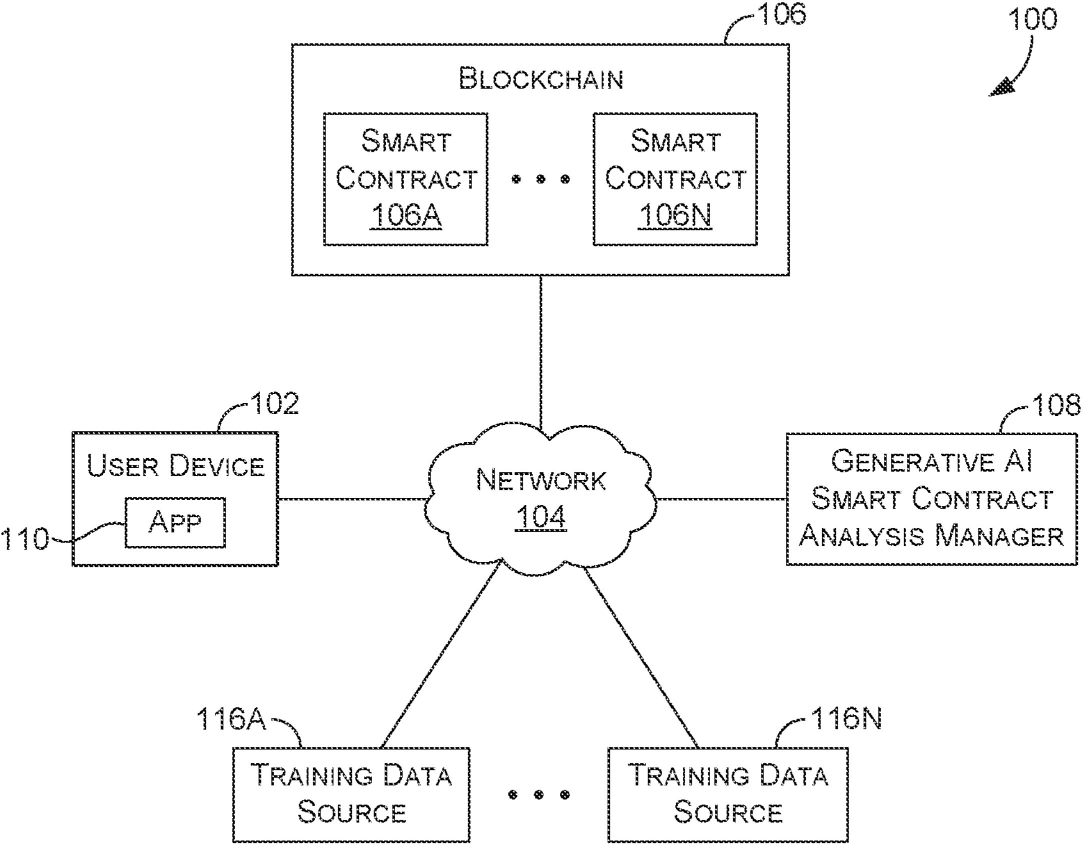
FIG. 1 depicts a diagram of an environment in which one or more embodiments of the present disclosure can be practiced, in accordance with various embodiments of the present disclosure.

Blockchain platforms offer a trustless transaction environment where smart contracts are transparent and secured by a blockchain consensus mechanism. Notwithstanding, most consumers do not understand the language of these contracts as smart contracts on blockchain are code written to execute functions rather than inform consumers about legal rights. For example, many consumers experience confusion when purchasing token-based assets such as digital artwork or "collectibles" as asset sellers frequently neglect to specify important terms of the transaction coded into the smart contract, such as whether the buyer is acquiring ownership of an asset or a license to use the asset. Further, many industry participants in smart contracts have limited knowledge regarding blockchain and/or contracts in general, which often results in missing or substandard contractual terms within the smart contracts. For example, contractual terms binding sellers to scarcity commitments implied in the sale of token-backed artwork are frequently absent from terms describing the smart contract even though the code related to the scarcity commitment may be present in the code of the smart contract. Even further, smart contract code may refer to code that resides outside the domain of the blockchain's governance. In this regard, off-chain contractual dependencies (e.g., outside the domain of the blockchain platform implementing the smart contract) may not be transparent from the code of the smart contract even to programmers that understand the smart contract code. For example, with respect to a smart contract related to a life insurance policy, the off-chain verification of qualifying conditions before distributing policy funds to beneficiaries, such as the death of an insured policy holder, may not be readily transparent from the code of the smart contract.

Currently, in order for the business to identify the terms of a smart contract (e.g., to facilitate understanding of the smart contract internally within the business or provide the terms of the contract to a customer of the business), a business must utilize programmers that understand the smart contract code to manually identify each term of the code of the smart contract and manually translate each term of the smart contract code so that each term can be understood. Similarly, when a customer of a business offering a smart contract desires to identify the terms of the smart contract, the customer necessarily must be able to understand smart contract code to be able to manually identify each term of the code of the smart contract and manually translate each term of the smart contract code. Further, in order for a business to offer a written contract instrument (e.g., an electronic contract, printed contract, etc.) along with the smart contract, the business must manually identify each term of the code of the smart contract and manually translate each term of the smart contract code into terms of a written contract instrument. The business must then manually identify any additional terms that will need to be included in the written contract instrument.

Accordingly, unnecessary computing resources are utilized by businesses offering smart contracts and customers of the businesses that offer smart contracts in conventional implementations. For example, computing and network resources are unnecessarily consumed to facilitate inspection of code pertaining to the smart contracts. For instance, computer input/output operations are unnecessarily increased in order for a business and/or customer to manually inspect, access and query the code pertaining to a smart contract, manually conduct searches related to the code to determine the meaning of the code of the smart contract, and/or manually provide written terms pertaining to the code of the smart contract. In this regard, the accessing, presentation and review process of the information related to and/or explaining the smart contract code is computationally expensive. Further, when the information related to and/or explaining the smart contract code is located in a disk array, there is unnecessary wear placed on the read/write head of the disk of the disk array each time the information is accessed. Even further, the processing of operations for the accessing, presentation and review process of the information related to and/or explaining the smart contract code decreases the throughput for a network, increases the network latency, and increases packet generation costs when the information is located over a network. In this regard, usage of network resources is multiplied due to the amount of information pertaining to the code of the smart contract that must be manually accessed, manually searched for, and manually generated by a business and/or customer.

As such, embodiments of the present disclosure are directed to using generative AI for automated analysis of smart contracts on blockchain in an efficient and effective manner. In this regard, natural language content can be efficiently and effectively generated for a business utilizing smart contracts or for a customer of the business in order to summarize and provide analysis of the smart contract in a natural language format.

Generally, and at a high level, embodiments described herein facilitate using generative AI for automated analysis of smart contracts on blockchain by utilizing a language model trained to generate natural language content based on smart contract code. When a user, such as a business, selects a smart contract to analyze, the code of the smart contract can be retrieved from the blockchain to generate natural language content based on the code of the smart contract using the language model. The generated natural language content based on the code of the smart contract can include a summary of the smart contract, itemizations of each condition of the smart contract, missing contract terms based on other smart contracts, warnings related to off-chain conditions, and suggested contract language based on the smart contract code. In this regard, the generated natural language content can be utilized to generate written contracts based on the smart contract code and/or provide standardized disclosures regarding the smart contract to the business and/or customers. Further, fine-tuning processes may be utilized to fine-tune the language model based on client-specific and/or subject-matter specific data.

In operation, a language model is trained to generate natural language content based on input smart contract code. For example, a language model can be trained using training data that includes smart contract code, corresponding descriptions of the smart contract code, smart contract metadata, and/or written contract instruments and/or templates. The training data can be retrieved from various sources, such as a public blockchain, private blockchain, smart contract code repositories (e.g., for smart contract authoring software), etc. In some embodiments, the language model can be trained on training data related to smart contract code written in various programming languages. In some embodiments, each language model may be trained on training data related to smart contract code of a specific programming language or a specific runtime environment (e.g., solidity for Ethereum Virtual Machine ("EVM"), viper for EVM, Teal for Algorand, etc.). In some embodiments, a language model can be trained using training data that includes information (e.g., publicly accessible information) related to the quality of smart contracts (e.g., problems associated with smart contracts), such as published articles discussing smart contracts.

In embodiments, fine-tuning processes (e.g., Low Rank Adaptations ("LoRA") or any type of fine-tuning process) are utilized to fine-tune the pre-trained language model for client-specific and/or subject-matter specific data. For example, the pre-trained language model may be fine-tuned using training data for smart contract code, corresponding descriptions of the smart contract code, smart contract metadata, and/or written contract instruments and/or templates of a specific client, such as a business. In some examples, the pre-trained language model may be fine-tuned using training data that includes information (e.g., publicly accessible information) related to the quality of smart contracts (e.g., problems associated with smart contracts), such as published articles discussing smart contracts for specific business-use cases. In this regard, the language model is fine-tuned for the specific business. As another example, the pre-trained language model may be fine-tuned using training data for smart contract code, corresponding descriptions of the smart contract code, smart contract metadata, and/or written contract instruments and/or templates related to a specific subject matter, such as currency conversion, art gallery sales, etc. In some examples, the pre-trained language model may be fine-tuned using training data that includes information (e.g., publicly accessible information) related to the quality of smart contracts (e.g., problems associated with smart contracts), such as published articles discussing smart contracts for a specific subject matter. In this regard, the language model is fine-tuned for the specific subject matter of the contract. In some embodiments, the language models and/or fine-tuned models utilize chain-of-thought prompting trained on contemporary contracts and related data sets in order to decompose the analysis of unseen smart contract code into intermediate steps.

After the language models and/or fine-tuned language models are trained, a user, such as a business offering a smart contract or a customer of the business, can select a smart contract to analyze through a user interface of the application. For example, the user can enter a unique contract number for a smart contract deployed on blockchain into the user interface of the application. The user can then select the custom parameters to generate natural language content based on the smart contract, such as whether the generated natural language content includes a summary of the smart contract, itemizations of each condition of the smart contract, missing contract terms based on other smart contracts, warnings related to off-chain conditions, and/or suggested contract language based on the smart contract code.

Following selection of the smart contract for analysis, the application can then retrieve and/or access the code of the smart contract from the blockchain in order to generate natural language content based on the smart contract code through the language model and/or fine-tuned language models. In some embodiments, the application can also retrieve smart contract metadata or data referenced by the smart contract metadata (e.g., such as accompanying written terms to the smart contract) in order to generate the natural language content through the language model and/or fine-tuned language models.

In some embodiments, the generated natural language content includes a summary of the smart contract code and/or accompanying written terms (e.g., accessed through smart contract metadata and/or a website presenting the smart contract). For example, the summary can include (1) purpose of the contract; (2) parties to the contract and their roles; (3) payment or compensation terms including one-time payments, subscriptions, and royalties; (4) timeframes of commitments specified in the contract; (5) presence or absence of accompanying legal terms; (6) dispute resolution and termination; (7) compliance requirements; and/or etc. In this regard, a summary of the smart contract code can be presented in a readable-format for the end user.

In some embodiments, the generated natural language content includes an itemizations of each condition of the smart contract code and/or accompanying written terms. At a high level, the smart contract code defines the conditions under which the blockchain will self-execute the smart contract. In this regard, the generated natural language content can include an itemization of each condition of the smart contract code to present the conditions present in the smart contract code in a readable format for the end user. Examples of conditions of smart contract code include a condition requiring the transfer of blockchain currencies from one party to another, a condition requiring acknowledgement or acceptance of supplementary contract terms, a condition requiring possession or acquisition of a related non-fungible token, a condition requiring a response from an external endpoint, and/or etc. In this regard, the generated natural language content can itemize each condition that must be fulfilled in order for the blockchain to execute the transaction code and present the itemized conditions in a readable format for the end user.

In some embodiments, the generated natural language content includes missing contract terms from the smart contract code and/or accompanying written terms. In some embodiments, suggested smart contract code, such as missing contract terms, is provided in programming language format. In some examples, the generated natural language content includes written terms and conditions referenced by the smart contract code that are unavailable. For example, if smart contract code includes a condition requiring acceptance of supplementary contract terms, and the supplementary contract terms are unavailable, the generated natural language content can present to the end user in a readable-format that the referenced supplementary contract terms are unavailable. In some examples, the generated natural language content includes transaction-specific terms and/or conditions that may be missing based on other related smart contracts. For example, if smart contract code for the exchange of currency is missing a condition present in related smart contracts related to the exchange of currency, the generated natural language content can present to the end user in a readable-format that the condition is missing from the code of the smart contract. As another example, if smart contract code references written terms, such as written terms within or referenced by the smart contract metadata, and the written terms are missing a written term present in related written terms of similar smart contracts, the generated natural language content can present to the end user in a readable-format the term that is missing from the written terms referenced by the smart contract.

In some embodiments, the generated natural language content based on the smart contract code and/or accompanying written terms (e.g., in smart contract metadata) includes warnings related to off-chain conditions. For example, the generated natural language content can present to the end user in a readable-format that a specific smart contract grants a perpetual license to content, but the storage location of the content is not available in perpetuity to the purchaser of the perpetual license to the content. As another example, the generated natural language content can present to the end user in a readable-format that a specific smart contract guarantees payments that are contingent on external validations that the consumer may be unaware of. As another example, if the smart contract metadata provides that a purchased item can be returned in a set amount of time for a specific reason, the generated natural language content may provide a statement to the end user regarding the off-chain conditions of the return policy.

In some embodiments, the generated natural language content from the smart contract code is suggested contract language based on the smart contract code. In this regard, the generated natural language content can provide suggested contract language and terms to accompany the smart contract code to provide a written contract instrument along with the smart contract code. For example, if smart contract code retrieved and/or accessed is related to the purchase of an item, the generated natural language content can present to the end user terms related the scarcity of the item being purchased through the smart contract, terms regarding resale of the item, etc.

In some embodiments, the generated natural language content can be utilized to provide standardized disclosures regarding the contents of the smart contract to the end user (e.g., a business offering a smart contract and/or customers of the business). For example, a consumer purchases a limited-edition player card utilizing a smart contract from a business. As a part of the transaction workflow, the consumer is presented with a standardized disclosure of the contractual requirements for acquiring the card, such as a summary including the payment terms, contractual conditions for re-selling the card, such as any transaction fees, and any additional rights of use inserted by the business. In this regard, the standardized disclosure improves transparency in smart contract transactions by generating a consumer-friendly disclosure of blockchain functions encoded in smart contracts. In some embodiments, the standardized disclosure of the generated natural language content abstracts common elements of smart contracts (e.g., such as the transfer of blockchain currencies) so that the common elements appear in a common format for all kinds of smart contracts.

In some embodiments, an application provides a smart contract authoring workflow that automatically generates smart contract code along with a written contract based on the smart contract code. For example, the application provides a number of user prompts in order to generate the smart contract code and written contract based on the smart contract code in order to deploy the smart contract code on the blockchain along with the accompanying written contract (e.g., in the smart contract metadata or a website present the smart contract). In some embodiments, after generating the smart contract code and written contract based on the smart contract code, the smart contract code and written contract can be edited by the end user. In this regard, the application can provide full control over the final contract language and/or smart contract code to the end user.

Advantageously, efficiencies of computing and network resources can be enhanced using implementations described herein. In particular, the automated analysis of smart contract code provides for a more efficient use of computing resources (e.g., higher throughput and reduced latency for a network, less packet generation costs, etc.) than conventional methods of manually inspecting, accessing and querying the code pertaining to a smart contract, manually conducting searches related to the code to determine the meaning of the code of the smart contract, and/or manually providing written terms pertaining to the code of the smart contract. The technology described herein results in less operations for the accessing, presentation and review process of the information related to and/or explaining the smart contract code over a computer network, which results in higher throughput, reduced latency and less packet generation costs as fewer packets are sent over a network. Therefore, the technology described herein conserves network resources.

Various terms are used throughout the description of embodiments provided herein. A brief overview of such terms and phrases is provided here for ease of understanding, but more details of these terms and phrases is provided throughout.

"Blockchain" refers to a decentralized digital ledger technology that records transactions across multiple computers in a secure and transparent manner. Blockchain uses cryptographic techniques to ensure the immutability and integrity of data. Blockchain typically operates in a trustless transaction environment, which refers to a system or network where participants can engage in transactions or exchanges without requiring a central authority. Instead, trust is established through cryptographic protocols and consensus mechanisms. Examples of applications utilizing blockchain include cryptocurrencies, smart contracts, etc. A public blockchain is a type of blockchain network that is open and accessible to anyone and without requiring approval to participate whereas a private blockchain is a type of blockchain network where access and permissions to participate are restricted.

A "smart contract" refers to a digital contract with the terms and/or conditions of an agreement directly written into code, which is referred to as "smart contract code." A smart contract automatically enforces and executes the agreed-upon actions when certain conditions are met, without the need for a central authority or an intermediary, through the smart contract code of the smart contract. Smart contracts are often used on blockchain platforms to ensure transparency, security, and automation in various processes, such as financial transactions, digital identity verification, etc. Examples of languages for drafting smart contracts include solidity, teal, etc.

"Smart contract metadata" refers to additional information or data associated with a smart contract on a blockchain. In some cases, smart contract metadata can include various details about the contract's purpose, functionality, version, author, and other relevant information. For example, smart contract metadata might include a description of the contract's purpose, author information, version, interfaces, user documentation, such as links to various documents related to the contract, parameters/settings, dependencies, security considerations, license information etc. Smart contract metadata is typically stored off-chain. Smart contract metadata can be stored in various formats, such as JavaScript Object Notation ("JSON") files, InterPlanetary File System ("IPFS), centralized databases, etc.

A "blockchain oracle" refers to a specialized service or mechanism that enables smart contracts on a blockchain to interact with external data or systems that exist outside of the blockchain. Blockchain oracles act as a bridge between the blockchain and the outside world, providing the necessary data to trigger and execute certain off-chain smart contract operations. As blockchain are typically isolated and cannot directly access data from external sources (e.g., real-world events, application programming interfaces ("APIs"), market prices, weather conditions, etc.), blockchain oracles enable smart contracts to make decisions based on real-world information. For example, a blockchain oracle can (1) fetch information from various external sources, such as web APIs, Internet-of-Things ("IT") devices, financial markets, weather services, etc.; (2) verify the data to ensure data accuracy and authenticity; (3) delivers the verified data to the smart contract on the blockchain in order to initiate execution of a condition of the smart contract, such as triggering a payment, based on the verified external data.

"Ethereum" refers to a decentralized, open-source blockchain platform that enables the creation and execution of smart contracts and decentralized applications ("Dapps"). "Ethereum Virtual Machine" ("EVM") refers to a runtime environment that executes smart contracts on the Ethereum blockchain. EVM is responsible for executing the code of smart contracts written in programming languages, such as solidity, viper, etc. EVM ensures that the execution of smart contracts is consistent and secure across all nodes in the Ethereum network, in order to enable decentralized and trustless interactions between participants.

"Algorand" refers to a blockchain platform designed to provide fast, secure, and decentralized digital transactions. Algorand's "Transaction Execution Approval Language" ("TEAL") refers to a programming language specifically designed for writing smart contracts on the Algorand blockchain platform. Teal allows developers to define the logic and conditions that govern the execution of smart contracts.

A "language model" generally refers to an AI system trained to understand and generate human-readable text. "Fine-tuning" refers to the process of adjusting a pre-trained model (e.g., a pre-trained language model) based on specific data to improve the performance of the model for a specific task related to the specific data. "Low Rank Adaptations" ("LoRA") refers to a fine-tuning process for language models (e.g., large language models ("LLMs") utilized to optimize the fine-tuning process. In LoRA, smaller parameters (e.g. LoRA parameters) are trained based on specific data downstream of the much larger matrix of the pre-trained model. The smaller LoRA parameters can be trained much faster, with less computational cost, than fine-tuning the entire larger matrix of the pre-trained model. "Chain-of-thought prompting" refers to a method for models to decompose multi-step problems into intermediate steps. Chain-of-thought prompting allows models to solve complex reasoning problems that cannot be solved through standard prompting.

Overview of Exemplary Environments of Using Generative AI for Automated Analysis of Smart Contracts on Blockchain Turning to FIG. 1, FIG. 1 depicts an example configuration of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory as further described with reference to FIG. 7.

It should be understood that operating environment 100 shown in FIG. 1 is an example of one suitable operating environment. Among other components not shown, operating environment 100 includes a user device 102, network 104, blockchain 106 (e.g., public blockchain or private blockchain) with smart contracts 106A-N, training data sources 116A-N, and generative AI smart contract analysis manager 108. Each of the components shown in FIG. 1 can be implemented via any type of computing device, such as one or more of computing device 700 described in connection to FIG. 7, for example.

These components can communicate with each other via network 104, which can be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, one or more private networks, one or more cellular networks, one or more peer-to-peer (P2P) networks, one or more mobile networks, or a combination of networks. Where network 104 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 104 is not described in significant detail.

It should be understood that any number of user devices, servers, and other components can be employed within operating environment 100 within the scope of the present disclosure. Each can comprise a single device or multiple devices cooperating in a distributed environment.

User device 102 can be any type of computing device capable of being operated by an individual(s) (e.g., a business offering smart contracts or a customer of the business). For example, in some implementations, such devices are the type of computing device described in relation to FIG. 7. By way of example and not limitation, user devices can be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device can include one or more processors, and one or more computer-readable media. The computer-readable media may include computer-readable instructions executable by the one or more processors. The instructions may be embodied by one or more applications, such as application 110 shown in FIG. 1. Application 110 is referred to as single applications for simplicity, but its functionality can be embodied by one or more applications in practice.

User device 102 can be a client device on a client-side of operating environment 100, while generative AI smart contract analysis manager 108 can be on a server-side of operating environment 100. Generative AI smart contract analysis manager 108 may comprise server-side software designed to work in conjunction with client-side software on user device 102 so as to implement any combination of the features and functionalities discussed in the present disclosure. An example of such client-side software is application 110 on user device 102. This division of operating environment 100 is provided to illustrate one example of a suitable environment, and it is noted there is no requirement for each implementation that any combination of user device 102 or generative AI smart contract analysis manager 108 to remain as separate entities.

Application 110 operating on user device 102 can generally be any application capable of facilitating the exchange of information between the user device(s) and the generative AI smart contract analysis manager 108 in identifying code of a smart contract for retrieval (e.g., code from smart contracts 106A-N on blockchain 106), presenting generated natural language content based on the smart contract code, and facilitating automated authoring workflows for smart contracts and corresponding written contracts based on the smart contracts. In some implementations, the application(s) comprises a web application, which can run in a web browser, and could be hosted at least partially on the server-side of environment 100. In addition, or instead, the application(s) can comprise a dedicated application. In some cases, the application is integrated into the operating system (e.g., as a service). It is therefore contemplated herein that "application" be interpreted broadly.

In accordance with embodiments herein, the application 110 can facilitate using generative AI for automated analysis of smart contracts on blockchain in an efficient and effective manner. In operation, a user, such as a business offering a smart contract or a customer of the business, can select a smart contract to analyze through a user interface provided via the application 110 displayed via a display screen of the user device 102. For example, the user can enter a unique contract number for a smart contract deployed on blockchain into the user interface of the application 110. The user can then select the custom parameters to generate natural language content based on the smart contract through a user interface provided via the application 110 displayed via a display screen of the user device 102. For example, the user can select custom parameters, such as whether the generated natural language content includes a summary of the smart contract, itemizations of each condition of the smart contract, missing contract terms based on other smart contracts, warnings related to off-chain conditions, and/or suggested contract language based on the smart contract code.

The application 110 communicates with generative AI smart contract analysis manager 108 the selected smart contract and/or the selected custom parameters. The generative AI smart contract analysis manager 108 can facilitate using generative AI for automated analysis of smart contracts on blockchain by retrieving and/or accessing the code of the smart contract from the blockchain in order to generate natural language content based on the smart contract code and/or the customer parameters. For example, generative AI smart contract analysis manager 108 retrieves and/or accesses smart contract code from smart contracts 106A-N stored on blockchain 106. In some embodiments, the generative AI smart contract analysis manager 108 can also retrieve smart contract metadata or data referenced by the smart contract and/or metadata, such as accompanying written terms to the smart contract, in order to generate the natural language content. The generated natural language content can then be provided to the application 110 for display via a display screen of the user device 102.

In some embodiments, the generated natural language content includes a summary of the smart contract code and/or accompanying written terms. In some embodiments, the generated natural language content includes an itemizations of each condition of the smart contract code and/or accompanying written terms. In some embodiments, the generated natural language content includes missing contract terms from the smart contract code and/or accompanying written terms. In some embodiments, suggested smart contract code, such as missing contract terms, is provided in programming language format. In some embodiments, the generated natural language content based on the smart contract code and/or accompanying written terms includes warnings related to off-chain conditions. In some embodiments, the generated natural language content from the smart contract code is suggested contract language based on the smart contract code. In some embodiments, the generated natural language content can be utilized to provide standardized disclosures regarding the contents of the smart contract to the end user (e.g., a business offering a smart contract and/or customers of the business).

In some embodiments, the application 110 provides a smart contract authoring workflow that automatically generates smart contract code along with a written contract based on the smart contract code. For example, the application 110 provides a number of user prompts through a user interface provided via the application 110 displayed via a display screen of the user device 102. The user prompts provided by application 110 allow the user to generate a smart contract with smart contract code and a corresponding written contract based on the smart contract code in order to deploy the smart contract code on the blockchain along with the accompanying written contract (e.g., located in or referenced by the smart contract metadata or a website presenting the smart contract). In some embodiments, after generating the smart contract code and written contract based on the smart contract code, the smart contract code and written contract can be edited by the end user through a user interface provided via the application 110 displayed via a display screen of the user device 102.

In operation, in order to generate the natural language content, a language model of the generative AI smart contract analysis manager 108 can be trained using training data from training data sources ***116a*-*116n* to generate natural language content based on input smart contract code and/or accompanying written terms. Data sources *116a*-*116n* may be any type of source providing data (e.g., training data utilized to generate natural language based on smart contracts). Generally, the generative AI smart contract analysis manager 108 receives data from any number of devices. As such, the generative AI smart contract analysis manager 108 can identify and/or collect data from various user devices, such as user device 102, and sources, such as data sources *116a*-*116n***.

Training data within a dataset may include, by way of example and not limitation, smart contract code, corresponding descriptions of the smart contract code, smart contract metadata, and/or written contract instruments and/or templates. The training data can be retrieved from various training data sources ***116a*-*116n*, such as a public blockchain, private blockchain, smart contract code repositories (e.g., for smart contract authoring software), data sources with information related to the quality of smart contracts, etc. In some embodiments, the language model can be trained on training data from training data sources *116a*-*116n* related to smart contract code written in various programming languages. In some embodiments, each language model may be trained on training data from training data sources *116a*-*116n*** related to smart contract code of a specific programming language or a specific runtime environment (e.g., solidity for EVM, viper for EVM, Teal for Algorand, etc.).

In embodiments, fine-tuning processes (e.g., LoRA or any type of fine-tuning process) are utilized to fine-tune a pre-trained language model for client-specific and/or subject-matter specific data. For example, the pre-trained language model may be fine-tuned using training data from training data sources ***116a*-*116n* related to a specific client, such as a business. In this regard, the language model is fine-tuned for the specific business. As another example, the pre-trained language model may be fine-tuned using training data from training data sources *116a*-*116n*** related to a specific subject matter, such as currency conversion, art gallery sales, etc. In this regard, the language model is fine-tuned for the specific subject matter of the contract. In some embodiments, the language models and/or fine-tuned models utilize chain-of-thought prompting trained on contemporary contracts and related data sets in order to decompose the analysis of unseen smart contract code into intermediate steps.

Such training data can be initially collected at remote locations or systems and transmitted to a data store for access by generative AI smart contract analysis manager 108. In accordance with embodiments described herein, training data collection may occur at data sources ***116a*-*116n*. In some cases, data sources *116a*-*116n*, or portion thereof, may include servers, data stores, or other components, including computing devices operated by businesses (e.g., for client-specific training data, etc.), public blockchain, private blockchain, smart contract code repositories (e.g., for smart contract authoring software), subject-matter-specific contract repositories, data sources with information related to the quality of smart contracts, etc. Training data can be obtained at a data source periodically or in an ongoing manner (or at any time) and provided to the generative AI smart contract analysis manager 108 to facilitate using generative AI for automated analysis of smart contracts on blockchain. Training data can be manually input into the generative AI smart contract analysis manager 108. For example, smart contract with smart contract code and corresponding written terms may be manually input into the generative AI smart contract analysis manager 108 in order to train a language model (e.g., language model(s) 206, finely-tuned language models 206A, etc.) operating at the generative AI smart contract analysis manager 108**.

Generative AI smart contract analysis manager 108 can be or include a server, including one or more processors, and one or more computer-readable media. The computer-readable media includes computer-readable instructions executable by the one or more processors. The instructions can optionally implement one or more components of generative AI smart contract analysis manager 108, described in additional detail below with respect to generative AI smart contract analysis manager 202 of FIG. 2.

At a high level, generative AI smart contract analysis manager 108 performs various functionality to facilitate efficient and effective use of generative AI to generate natural language content based on smart contract code. Further, the generative AI smart contract analysis manager 108 can facilitate retrieval of smart contract code (e.g., code from smart contracts 106A-N on blockchain 106), generating natural language content based on the smart contract code, and facilitating automated authoring workflows for smart contracts and corresponding written contracts based on the smart contracts. In this regard, generative AI smart contract analysis manager 108 can provide generated natural language content based on the smart contract code to application 110 of the user device. The generated natural language content can be displayed via a display screen of the user device 102 and may be presented in any manner.

For cloud-based implementations, the instructions on generative AI smart contract analysis manager 108 can implement one or more components, and application 110 can be utilized by a user to interface with the functionality implemented on generative AI smart contract analysis manager 108. In some cases, application 110 comprises a web browser. In other cases, generative AI smart contract analysis manager 108 may not be required. For example, the components of generative AI smart contract analysis manager 108 may be implemented completely on a user device, such as user device 102. In this case, generative AI smart contract analysis manager 108 may be embodied at least partially by the instructions corresponding to application 110.

Thus, it should be appreciated that generative AI smart contract analysis manager 108 may be provided via multiple devices arranged in a distributed environment that collectively provide the functionality described herein. Additionally, other components not shown may also be included within the distributed environment. In addition, or instead, generative AI smart contract analysis manager 108 can be integrated, at least partially, into a user device, such as user device 102. Furthermore, generative AI smart contract analysis manager 108 may at least partially be embodied as a cloud computing service.

Figure 2:
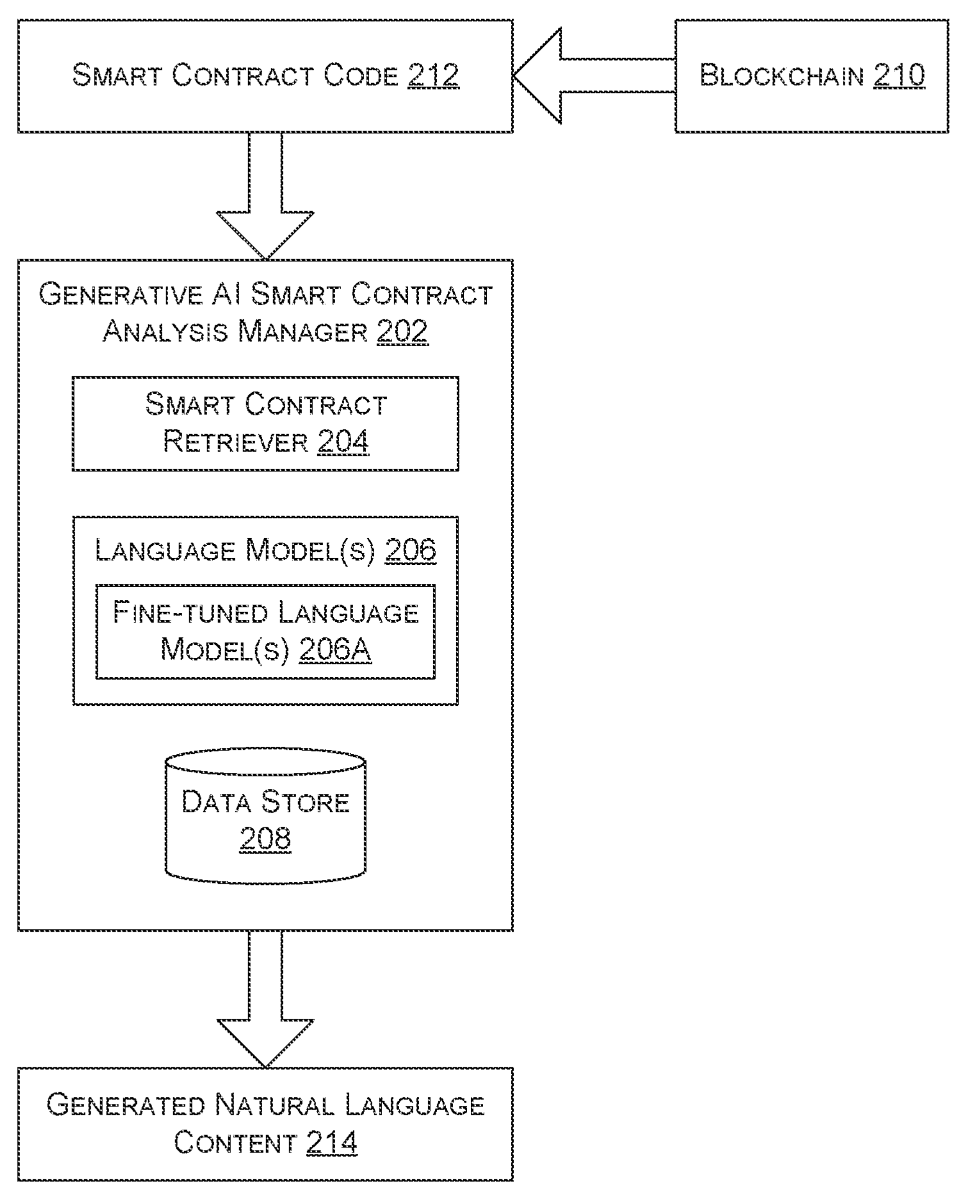
FIG. 2 depicts an example configuration of an operating environment in which some implementations of the present disclosure can be employed, in accordance with various embodiments of the present disclosure.

Referring to FIG. 2, aspects of an illustrative generative AI smart contract analysis management system are shown, in accordance with various embodiments of the present disclosure. At a high level, embodiments described herein using generative AI for automated analysis of smart contracts on blockchain by generating natural language content based on smart contract code through a language model. As shown in FIG. 2, generative AI smart contract analysis manager 202 includes a smart contract retriever 204, a language model(s) 206, fine-tuned language model(s) 206A, and a data store 208. The foregoing components of generative AI smart contract analysis manager 202 can be implemented, for example, in operating environment 100 of FIG. 1. In particular, those components may be integrated into any suitable combination of user devices 102 and/or generative AI smart contract analysis manager 108.

Data store 208 can store computer instructions (e.g., software program instructions, routines, or services), data, and/or models used in embodiments described herein. In some implementations, data store 208 stores information or data received or generated via the various components of generative AI smart contract analysis manager 202 and provides the various components with access to that information or data, as needed. Although depicted as one component, data store 208 may be embodied as one or more data stores. Further, the information in data store 208 may be distributed in any suitable manner across one or more data stores for storage (which may be hosted externally).

In embodiments, data stored in data store 208 includes training data, generated natural language content, contract templates for generating smart contracts and/or accompanying legal terms, standardized disclosure templates, and/or the like. For example, data store 208 stores smart contract code, corresponding descriptions of the smart contract code, smart contract metadata, information related to the quality of smart contracts, and/or written contract instruments and/or templates retrieved and/or accessed from various data sources, such as a public blockchain, private blockchain, smart contract code repositories (e.g., for smart contract authoring software), etc. In some cases, generative AI smart contract analysis manager 202, or components associated therewith, can obtain data from client devices (e.g., client-specific training data, such as smart contracts or written contracts of a specific business). In some cases, data can be received from one or more data stores in the cloud, or data generated by the generative AI smart contract analysis manager 202. In some embodiments, data stored in data store 208 includes training data related to a specific client, such as a business. In some embodiments, data stored in data store 208 includes training data related to a specific subject matter, such as currency conversion, art gallery sales, etc. In some embodiments, data stored in data store 208 includes computer instructions related to chain-of-thought prompting.

The smart contract retriever 204 is generally configured to retrieve and/or access code of a smart contract from various sources, such as a public blockchain. The smart contract retriever 204 can include rules, conditions, associations, models, algorithms, or the like to retrieve and/or access code of a smart contract. In embodiments, a user, such as a business offering a smart contract or a customer of the business, can select a smart contract to analyze (e.g., through a user interface provided via the application 110 displayed via a display screen of the user device 102 of FIG. 1). In the example shown in FIG. 2, the smart contract retriever 204 retrieves and/or access the smart contract code 212 of the selected contract from blockchain 210 (e.g., public blockchain or private blockchain). In embodiments, the smart contracts retriever 204 utilizes API(s) to retrieve smart contract code and/or corresponding written contracts from various data sources, such as blockchain 210, etc.

The language model(s) 206 and/or fine-tuned language models 206A are generally configured to generate natural language content based on smart contract code and/or the customer parameters selected by user. The language model(s) 206 and/or fine-tuned language models 206A can include rules, conditions, associations, models, algorithms, or the like to generate natural language content based on smart contract code and/or the customer parameters selected by user. For example, language model(s) 206 and/or fine-tuned language models 206A may comprise natural language processing techniques, statistical model, fuzzy logic, neural network, finite state machine, support vector machine, logistic regression, clustering, or machine-learning techniques, similar statistical classification processes, or combinations of these to generate natural language content based on smart contract code and/or the customer parameters selected by user.

In the example shown in FIG. 2, after the smart contract retriever 204 retrieves and/or access the smart contract code 212 of the selected contract from blockchain 210, language model(s) 206 and/or fine-tuned language models 206A generates generated natural language content 214 based on the smart contract code 212. The generated natural language content 214 is then presented for display to the end user (e.g., through a user interface provided via the application 110 displayed via a display screen of the user device 102 of FIG. 1).

In embodiments, language model(s) 206 is trained to generate natural language content based on input smart contract code. For example, language model(s) 206 can be trained using training data that includes smart contract code, corresponding descriptions of the smart contract code, smart contract metadata, and/or written contract instruments and/or templates stored in data store 208. In some embodiments, language model(s) 206 can be trained using training data that includes information (e.g., publicly accessible information) related to the quality of smart contracts (e.g., problems associated with smart contracts), such as published articles discussing smart contracts, store in data store 208. The training data can be retrieved from various sources, such as a public blockchain, private blockchain, smart contract code repositories (e.g., for smart contract authoring software), etc. and stored in data store 208. In some embodiments, language model(s) 206 can be trained on training data related to smart contract code written in various programming languages. In some embodiments, each language model(s) 206 may be trained on training data related to smart contract code of a specific programming language or a specific runtime environment (e.g., solidity for Ethereum Virtual Machine ("EVM"), viper for EVM, Teal for Algorand, etc.).

In embodiments, fine-tuned language model(s) 206A utilize fine-tuning processes, such as LoRA or any type of fine-tuning process to fine-tune the pre-trained language model(s) 206 for client-specific and/or subject-matter specific data. For example, fine-tuned language model(s) 206A may be fine-tuned using training data for smart contract code, corresponding descriptions of the smart contract code, smart contract metadata, and/or written contract instruments and/or templates of a specific client, such as a business, stored in data store 208. In some examples, fine-tuned language model(s) 206A may be fine-tuned using training data that includes information (e.g., publicly accessible information) related to the quality of smart contracts (e.g., problems associated with smart contracts), such as published articles discussing smart contracts for specific business-use cases, stored in data store 208. In this regard, fine-tuned language model(s) 206A is fine-tuned for the specific business. As another example, fine-tuned language model(s) 206A may be fine-tuned using training data for smart contract code, corresponding descriptions of the smart contract code, smart contract metadata, and/or written contract instruments and/or templates related to a specific subject matter, such as currency conversion, art gallery sales, etc., stored in data store 208. In some examples, fine-tuned language model(s) 206A may be fine-tuned using training data that includes information (e.g., publicly accessible information) related to the quality of smart contracts (e.g., problems associated with smart contracts), such as published articles discussing smart contracts for a specific subject matter, stored in data store 208. In this regard, fine-tuned language model(s) 206A is fine-tuned for the specific subject matter of the contract. In some embodiments, the language model(s) 206 and/or fine-tuned language model(s) 206A utilize chain-of-thought prompting trained on contemporary contracts and related data sets in order to decompose the analysis of unseen smart contract code into intermediate steps as stored in data store 208.

Language model(s) 206 and/or fine-tuned language model(s) 206A generates natural language content (e.g., generated natural language content 214) based on input smart contract code. In some embodiments, the generated natural language content includes a summary of the smart contract code and/or accompanying written terms. In some embodiments, the generated natural language content includes an itemizations of each condition of the smart contract code and/or accompanying written terms. In some embodiments, the generated natural language content includes missing contract terms from the smart contract code and/or accompanying written terms. In some embodiments, suggested smart contract code, such as missing contract terms, is provided in programming language format. In some embodiments, the generated natural language content based on the smart contract code and/or accompanying written terms includes warnings related to off-chain conditions. In some embodiments, the generated natural language content from the smart contract code is suggested contract language based on the smart contract code. In some embodiments, the generated natural language content can be utilized to provide standardized disclosures regarding the contents of the smart contract to the end user (e.g., a business offering a smart contract and/or customers of the business).

Figure 3:
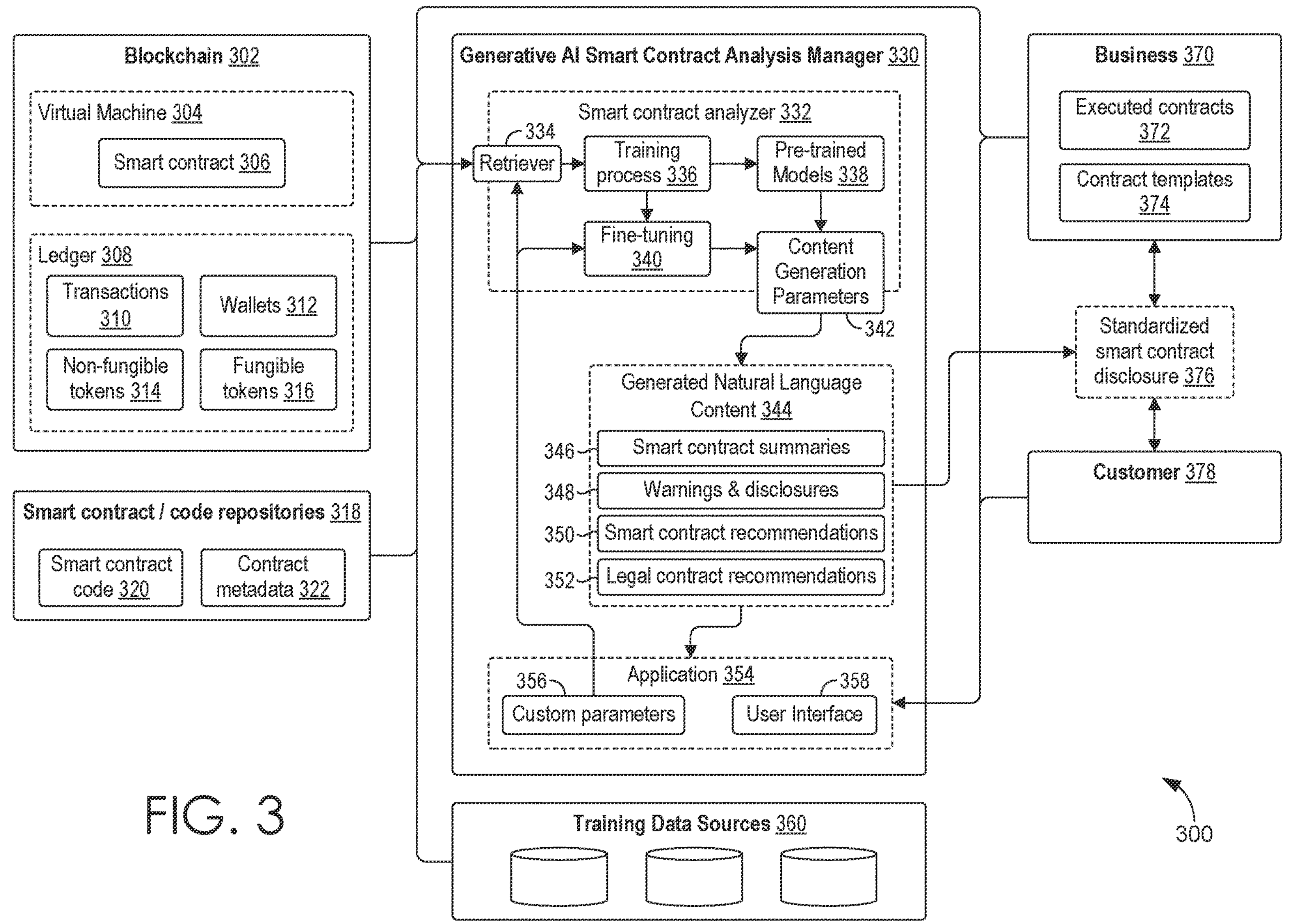
FIG. 3 provides an example diagram of a model implemented to use generative AI for automated analysis of smart contracts on blockchain, in accordance with embodiments of the present disclosure.

FIG. 3 provides an example diagram of an example model implemented to use generative AI for automated analysis of smart contracts on blockchain, in accordance with embodiments described herein. As described herein, such a model can be used to generate natural language content based on smart contracts on blockchain in an automated manner. Diagram 300 is an example diagram for an example model implemented to use generative AI for automated analysis of smart contracts on blockchain.

As shown, generative AI smart contract analysis manager 330 includes a smart contract analyzer 332. Smart contract analyzer 332 retrieves and/or accesses data through retriever 332 in order to utilize the data to train models (e.g., fine-tuning 340 and/or pre-trained models 338) of smart contract analyzer 332. The retriever 334 retrieves and/or accesses data from blockchain 302 (e.g., public blockchain or private blockchain), smart contract code repositories 318, and/or training data sources 360. For example, retriever 334 retrieves various smart contract code 320 and/or contract metadata 322 from smart contract repositories 318, including contract authoring software solutions via an application programming interfaces ("API") to the contract authoring software solution. As another example, retriever 334 retrieves a smart contract 306 from a virtual machine 304 (e.g., a distributed state machine, a blockchain platform, such as EVM, Teal, etc.). As another example, retriever 334 can also retrieve data from ledger(s) 308, such as transactions 310, wallets 312, non-fungible tokens 314, and fungible tokens 316. In embodiments, retriever 334 can also retrieve, access and/or store data as training data through training data sources 360 to train models (e.g., fine-tuning 340 and/or pre-trained models 338) of smart contract analyzer 332. In some embodiments, retriever can retrieve and/or access executed contracts 372 and/or contract templates 374 of a specific business. Further, the smart contract repositories 318 may include training data pertaining to a specific business (e.g., business 370), a specific industry (e.g., art gallery sales, etc.), or specific subject matter (e.g., currency conversion, etc.) in order to utilize fine-tuning processes 340.

Training processes 336 can include training pre-trained language model 338 to generate generated natural language content 344 based on smart contract code and/or content generation parameters 342. For example, pre-trained language model 338 is trained using training data that includes smart contract code, corresponding descriptions of the smart contract code, smart contract metadata, information related to the quality of smart contracts, and/or written contract instruments and/or templates. The training data can be retrieved from various sources, such as a blockchain 302 (e.g., public blockchain or private blockchain), smart contract code repositories 318 (e.g., for smart contract authoring software), etc.

Further, training processes 336 can include fine-tuning processes 340 (e.g., through LoRA or any type of fine-tuning process), which are utilized to fine-tune the pre-trained language model 338 for client-specific and/or subject-matter specific data. For example, the pre-trained language model 338 may use fine-tuning processes 340 using training data (e.g., executed contracts 372 and/or contract templates 374 of business 370) for smart contract code, corresponding descriptions of the smart contract code, smart contract metadata, information related to the quality of smart contracts, and/or written contract instruments and/or templates of a specific client, such as a business (e.g., business 370). As another example, the pre-trained language model may be fine-tuned using training data for smart contract code, corresponding descriptions of the smart contract code, smart contract metadata, information related to the quality of smart contracts, and/or written contract instruments and/or templates related to a specific subject matter, such as currency conversion, art gallery sales, etc. In some embodiments, the pre-trained language models 338 and/or fine-tuning processes 340 utilize chain-of-thought prompting trained on contemporary contracts and related data sets in order to decompose the analysis of unseen smart contract code into intermediate steps.

In some embodiments, fine-tuning processes 340 may include utilizing a LLM with sufficient capacity (e.g., number of parameters or base coding expertise) to handle complex tasks, such as analyzing smart contract code. In some embodiments, fine-tuning processes 340 may include training the fine-tuned language model on a dataset containing various smart contract examples and relevant contextual information, focusing on understanding their structure, logic, and functionality. In some embodiments, fine-tuning processes 340 may include utilizing chain-of-thought prompts during inference by providing related questions to guide the model's analysis of unseen smart contract code snippets in order to assist the model to break down complex tasks into smaller steps that are easier to comprehend. In some embodiments, fine-tuning processes 340 may include monitoring the performance of the fine-tuned language model and making necessary adjustments in prompting techniques or training data in order to ensure the fine-tuned language model maintains accuracy and efficiency in analyzing smart contract code. In some embodiments, fine-tuning processes 340 may include integrating the trained large language model into the analysis pipeline for detecting vulnerabilities, generating documentation, summarizing the contract's features and goals, or automating other tasks related to smart contract auditing. In some embodiments, fine-tuning processes 340 may include regularly updating the fine-tuned language model with new datasets and improved training techniques as advancements in AI and smart contract technology continue to evolve in order to ensure the model(s) remains up-to-date and capable of handling complex tasks effectively.

An example set of prompts which can be generated from chain-of-thought analysis by the LLM agent is provided:

1. Variable Extraction: Given the following smart contract, extract the contract's variables:

```
contract ExampleDataStorage {
  uint256 storedData;
  function set(uint256 x) public {
    storedData = x;
  }
  function get( ) public view returns (uint256) {
    return storedData;
  }
}
```
```

2. Analyze the 'get' function: Based on the smart contract, describe the functionality and effects of the 'get' function. Mention any state changes or potential side effects.
3. Analyze the 'set' function: Continuing from the previous steps, analyze the 'set' function. Explain what it does, how it operates, and any relevant considerations.
4. Step 4: Complete the analysis: As the 'get' function and 'set' function of the smart contract have been analyzed, the information from the findings can be summarized in order to provide relevant information to the end user.

A user, such as a business (e.g., business 370) offering a smart contract or a customer (e.g., customer 378) of the business, can select a smart contract to analyze through a user interface 358 of the application 354. For example, the user can enter a unique contract number for a smart contract deployed on blockchain into the user interface 358 of the application 354. The user can then select the custom parameters 356 to generate natural language content (e.g., generated natural language content 344) based on the smart contract, such as whether the generated natural language content includes a summary of the smart contract, itemizations of each condition of the smart contract, missing contract terms based on other smart contracts, warnings related to off-chain conditions, and/or suggested contract language based on the smart contract code. The custom parameters 356 can be utilized as content generation parameters 342 in order to generate the generated natural language content 342. In this regard, a user (e.g., a business 370 or a customer 378) may specify the generated natural language content 344 in order for smart contract analyzer to output the desire generated natural language content 344.

Following selection of the smart contract for analysis, retriever 334 can then retrieve and/or access the code of the smart contract 306 from the blockchain 304 in order to generate natural language content (e.g., generated natural language content 344) based on the smart contract code and content generation parameters 342 through the language model (e.g., pre-trained models 338) and/or fine-tuned language models (e.g., fine-tuning processes 340). In some embodiments, retriever 334 can also retrieve and/or access smart contract metadata or data referenced by the smart contract metadata (e.g., such as accompanying written terms to the smart contract) in order to generate the generated natural language content 344. Generated natural language content 344 can include smart contract summaries 346, warnings and disclosures 348, smart contract recommenda-
``` tions 350, and/or legal contract recommendations 352. The generated natural language content 344 is then output through a user interface 358 of application 354.

In some embodiments, the generated natural language content 344 includes smart contract summaries 346 of the smart contract code and/or accompanying written terms. For example, smart contract summaries 346 can include (1) purpose of the contract; (2) parties to the contract and their roles; (3) payment or compensation terms including one-time payments, subscriptions, and royalties; (4) timeframes of commitments specified in the contract; (5) presence or absence of accompanying legal terms; (6) dispute resolution and termination; (7) compliance requirements; and/or etc. In some embodiments, smart contract summaries 346 can includes an itemization of each condition of the smart contract code and/or accompanying written terms.

In some embodiments, the generated natural language content 344 based on the smart contract code and/or accompanying written terms includes warnings and disclosure 348 related to off-chain conditions. For example, the generated natural language content 344 can present to the end user in a readable-format that a specific smart contract grants a perpetual license to content, but the storage location of the content is not available in perpetuity to the purchaser of the perpetual license to the content.

In some embodiments, the generated natural language content 344 includes smart contract recommendations 350, which includes missing contract terms from the smart contract code and/or accompanying written terms. In some embodiments, the smart contract recommendations 350 includes suggested smart contract code, such as missing contract terms, in programming language format. In some embodiments, the smart contract recommendations 350 are provided in natural language format. In some examples, the generated natural language content 344 includes written terms and conditions referenced by the smart contract code that are unavailable. For example, if smart contract code includes a condition requiring acceptance of supplementary contract terms, and the supplementary contract terms are unavailable, the generated natural language content 344 can present to the end user in a readable-format that the referenced supplementary contract terms are unavailable. In some examples, the generated natural language content 344 includes transaction-specific terms and/or conditions that may be missing based on other related smart contracts. For example, if smart contract code for the exchange of currency is missing a condition present in related smart contracts related to the exchange of currency, the generated natural language content 344 can present to the end user in a readable-format that the condition is missing from the code of the smart contract. As another example, if smart contract code for the exchange of currency references written terms and conditions, such as in the smart contract metadata, and the written terms and conditions is missing a term present in related written terms and conditions related to the exchange of currency, the generated natural language content 344 can present to the end user in a readable-format that the term is missing from the written terms and conditions referenced by the smart contract.

In some embodiments, the generated natural language content 344 from the smart contract code includes legal contract recommendations 352, which includes suggested contract language based on the smart contract code. In this regard, the generated natural language content 344 can provide suggested contract language and terms to accompany the smart contract code to provide a written contract instrument along with the smart contract code. For example, if smart contract code retrieved and/or accessed is related to the purchase of an item, the generated natural language content 344 can present to the end user terms related the scarcity of the item being purchased through the smart contract, terms regarding resale of the item, etc.

In some embodiments, the generated natural language content can be utilized to provide standardized smart contract disclosures 376 regarding the contents of the smart contract to the end user (e.g., a business 370 offering a smart contract and/or customers 378 of the business). For example, a consumer purchases a limited-edition player card utilizing a smart contract from a business. As a part of the transaction workflow, the consumer is presented with a standardized disclosure of the contractual requirements for acquiring the card, such as a summary including the payment terms, contractual conditions for re-selling the card, such as any transaction fees, and any additional rights of use inserted by the business. In this regard, the standardized disclosure improves transparency in smart contract transactions by generating a consumer-friendly disclosure of blockchain functions encoded in smart contracts. In some embodiments, the standardized smart contract disclosures 376 of the generated natural language content abstracts common elements of smart contracts (e.g., such as the transfer of blockchain currencies) so that the common elements appear in a common format for all kinds of smart contracts.

In some embodiments, an application 354 provides a smart contract authoring workflow that automatically generates smart contract code along with a written contract based on the smart contract code. For example, the application 354 provides a number of user prompts in order to generate the smart contract code and written contract based on the smart contract code in order to deploy the smart contract code on the blockchain 302 along with the accompanying written contract (e.g., in the smart contract metadata or a website present the smart contract). In some embodiments, after generating the smart contract code and written contract based on the smart contract code, the smart contract code and written contract can be edited by the end user (e.g., business 370). In this regard, the application 354 can provide full control over the final contract language and/or smart contract code to the end user.

Figure 4:
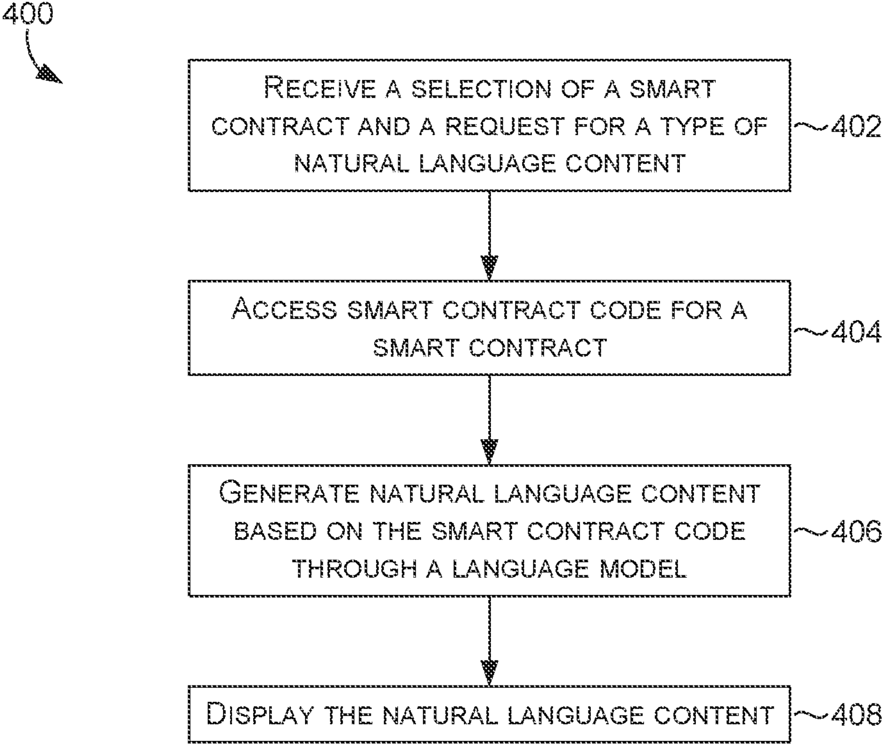
FIG. 4 is a process flow showing a method for using generative AI for automated analysis of smart contracts on blockchain, in accordance with embodiments of the present disclosure.
Figure 5:
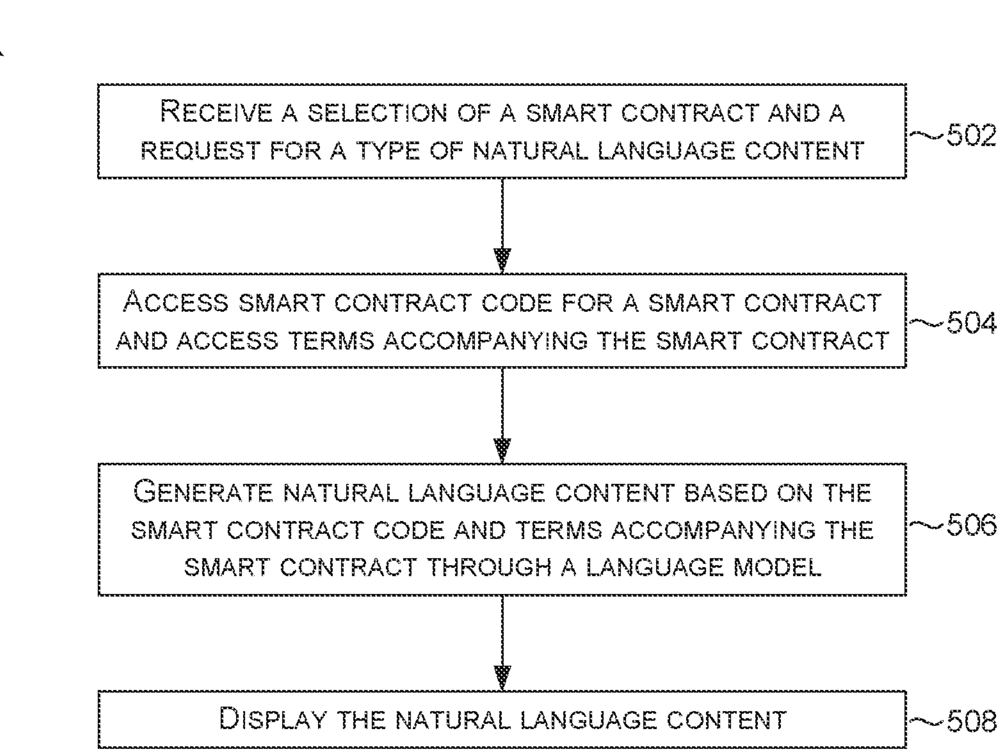
FIG. 5 is a process flow showing a method for using generative AI for automated analysis of smart contracts on blockchain, in accordance with embodiments of the present disclosure.
Figure 6:
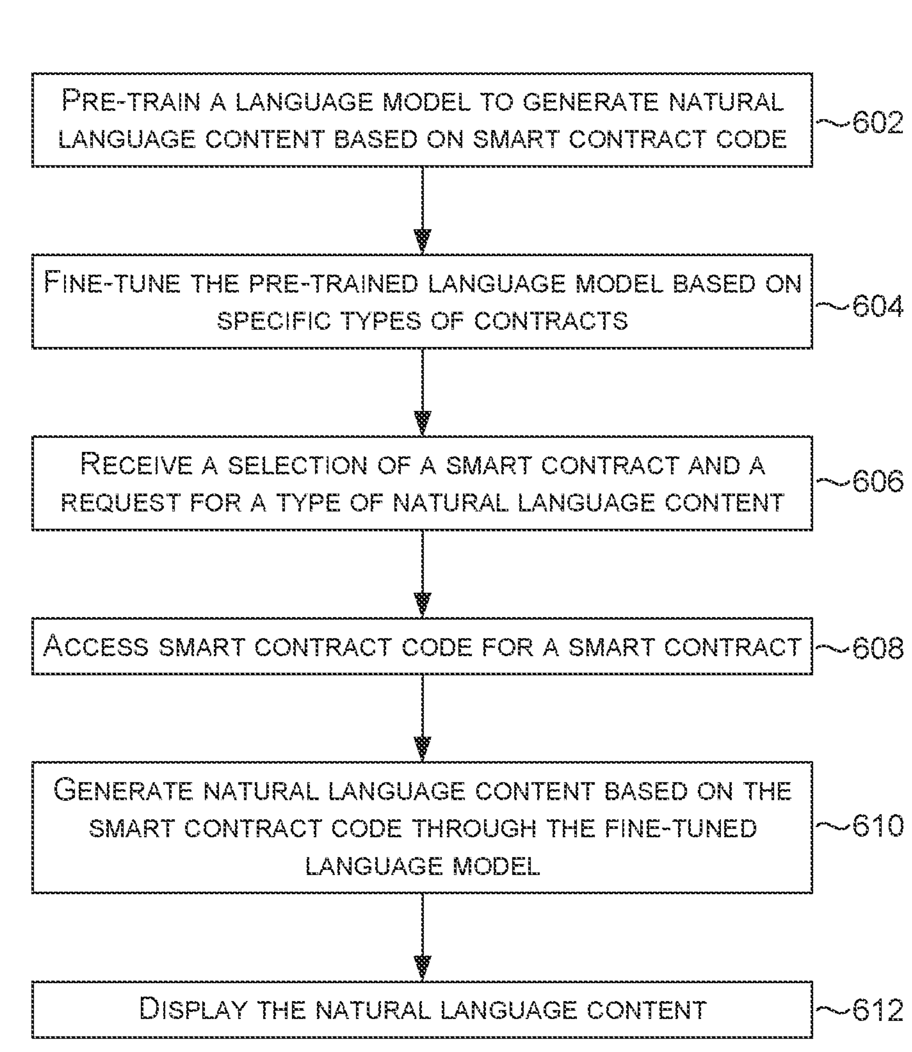
FIG. 6 is a process flow showing a method for training a generative AI model for automated analysis of smart contracts on blockchain, in accordance with embodiments of the present disclosure.

Exemplary Implementations of Using Generative AI for Automated Analysis of Smart Contracts on Blockchain With reference now to FIGS. 4-6, FIGS. 4-6 provide method flows related to facilitating using generative AI for automated analysis of smart contracts on blockchain, in accordance with embodiments of the present technology. Each block of method 400, 500 and 600 comprises a computing process that can be performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The method flows of FIGS. 4-6 are exemplary only and not intended to be limiting. As can be appreciated, in some embodiments, method flows 400-600 can be implemented, at least in part, to facilitate using generative AI for automated analysis of smart contracts on blockchain.

Turning to FIG. 4, a flow diagram 400 is provided showing an embodiment of a method 400 for using generative AI for automated analysis of smart contracts on blockchain, in accordance with embodiments described herein.

Initially, at block 402, a selection of a smart contract is received along with a request to generate a type of natural language content. For example, user can enter a unique contract number for a smart contract deployed on blockchain into the user interface of the application. The user can then select the custom parameters to generate natural language content based on the smart contract, such as whether the generated natural language content includes a summary of the smart contract, itemizations of each condition of the smart contract, missing contract terms based on other smart contracts, warnings related to off-chain conditions, and/or suggested contract language based on the smart contract code.

At block 404, the smart contract code for the selected smart contract is accessed. For example, following selection of the smart contract for analysis, the application can then retrieve and/or access the code of the smart contract from the blockchain. In some embodiments, application can also retrieve and/or access smart contract metadata or data referenced by the smart contract code and/or metadata, such as accompanying legal terms.

At block 406, natural language content is generated by a language model based on the smart contract code. In some embodiments, the generated natural language content includes a summary of the smart contract code. In some embodiments, the generated natural language content includes an itemizations of each condition of the smart contract code. In some embodiments, the generated natural language content includes missing conditions from the smart contract code. In some embodiments, the generated natural language content includes warnings related to off-chain conditions of the smart contract code. In some embodiments, the natural language content includes suggested contract language based on the smart contract code. In this regard, analysis of the smart contract code can be presented in a natural language readable-format for the end user. At block 408, the natural language content is then displayed to the end user, such as a business offering the smart contract or a customer of the business.

Turning now to FIG. 5, a flow diagram 500 is provided showing an embodiment of a method 500 for using generative AI for automated analysis of smart contracts on blockchain, in accordance with embodiments described herein. Initially, at block 502, a selection of a smart contract is received along with a request to generate a type of natural language content. At block 504, the smart contract code for the selected smart contract is accessed and any terms accompanying the smart contract (e.g., such as written terms referenced by the smart contract metadata) are also accessed.

At block 506, natural language content is generated by a language model based on the smart contract code and the terms accompanying the smart contract. In some embodiments, the generated natural language content includes a summary of the smart contract code and/or accompanying terms. In some embodiments, the generated natural language content includes an itemizations of each condition of the smart contract code and/or each condition of the accompanying terms. In some embodiments, the generated natural language content includes any missing conditions and/or terms from the smart contract code and/or the accompanying terms. In some embodiments, the generated natural language content includes warnings related to off-chain conditions of the smart contract code and/or accompanying terms. In some embodiments, the natural language content includes suggested contract language based on the smart contract code and/or accompanying terms. In this regard, analysis of the smart contract code and any accompanying terms can be presented in a natural language readable-format for the end user. At block 508, the natural language content is then displayed to the end user, such as a business offering the smart contract or a customer of the business.

Turning now to FIG. 6, a flow diagram 600 is provided showing an embodiment of a method 600 for training a generative AI model for automated analysis of smart contracts on blockchain, in accordance with embodiments described herein. Initially, at block 602, a language model is pre-trained to generate natural language content based on smart contract code and/or accompanying terms to the smart contract code. For example, a language model can be pre-trained using training data that includes smart contract code, corresponding descriptions of the smart contract code, smart contract metadata, and/or written contract instruments and/or templates. The training data can be retrieved from various sources, such as a public blockchain, private blockchain, smart contract code repositories (e.g., for smart contract authoring software), etc. In some embodiments, the language model can be pre-trained on training data related to smart contract code written in various programming languages. In some embodiments, each language model may be trained on training data related to smart contract code of a specific programming language or a specific runtime environment (e.g., solidity for Ethereum Virtual Machine ("EVM"), viper for EVM, Teal for Algorand, etc.).

At block 604, the pre-trained language model is fine-tuned based on specific types of contracts. In this regard, fine-tuning processes (e.g., LoRA or any type of fine-tuning process) are utilized to fine-tune the pre-trained language model for client-specific and/or subject-matter specific data. For example, the pre-trained language model may be fine-tuned using training data for smart contract code, corresponding descriptions of the smart contract code, smart contract metadata, and/or written contract instruments and/or templates of a specific client, such as a business. In this regard, the language model is fine-tuned for the specific business. As another example, the pre-trained language model may be fine-tuned using training data for smart contract code, corresponding descriptions of the smart contract code, smart contract metadata, and/or written contract instruments and/or templates related to a specific subject matter, such as currency conversion, art gallery sales, etc. In this regard, the language model is fine-tuned for the specific subject matter of the contract. In some embodiments, the language models and/or fine-tuned models utilize chain-of-thought prompting trained on contemporary contracts and related data sets in order to decompose the analysis of unseen smart contract code into intermediate steps.

At block 606, a selection of a smart contract is received along with a request to generate a type of natural language content. At block 608, the smart contract code for the selected smart contract is accessed and/or any terms accompanying the smart contract. At block 610, natural language content is generated by the fine-tuned language model based on the smart contract code and/or the terms accompanying the smart contract. At block 612, the natural language content is then displayed to the end user, such as a business offering the smart contract or a customer of the business.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 7:
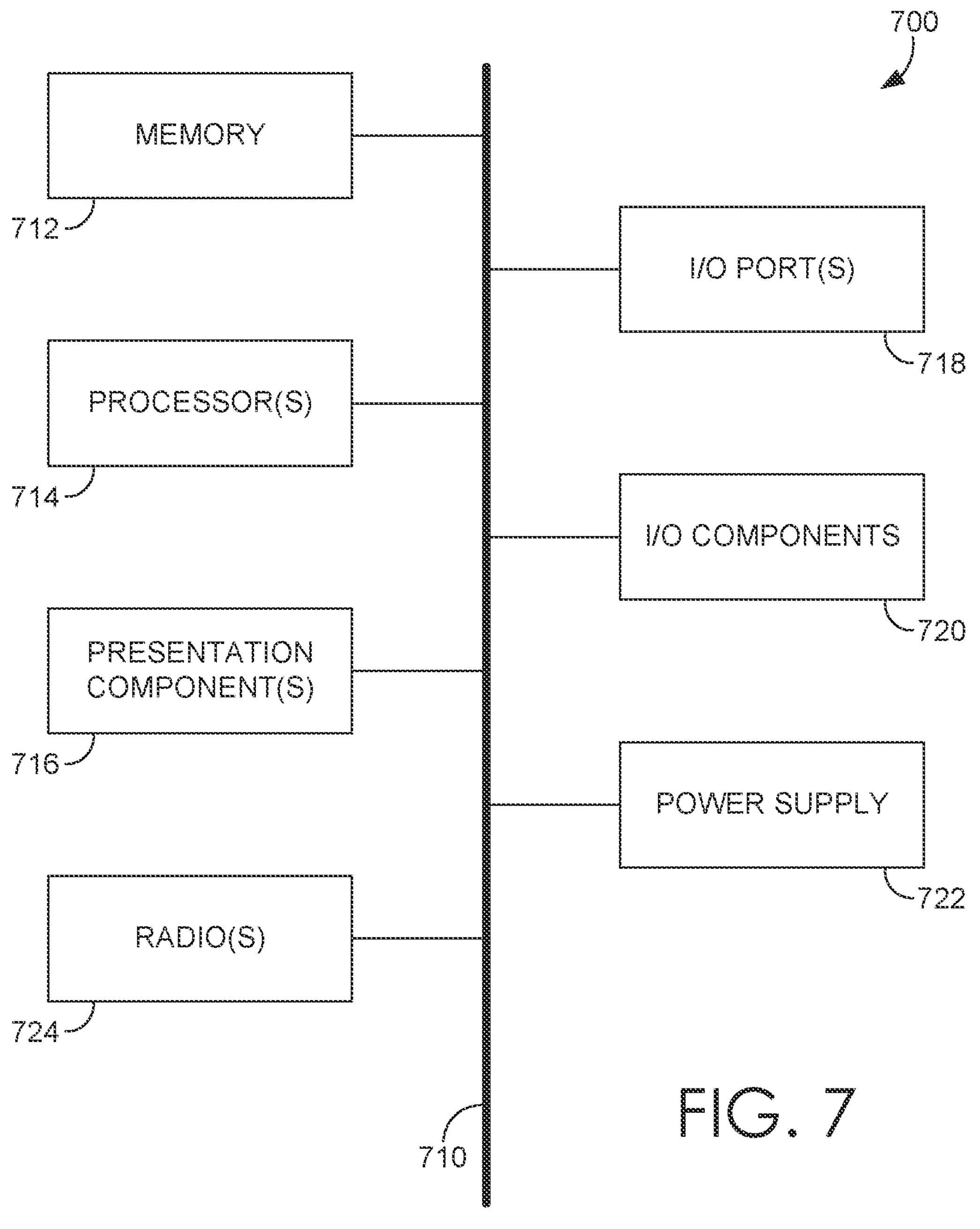
FIG. 7 is a block diagram of an example computing device in which embodiments of the present disclosure can be employed.

Referring to the drawings in general, and initially to FIG. 7 in particular, an exemplary operating environment for implementing aspects of the technology described herein is shown and designated generally as computing device 700. Computing device 700 is just one example of a suitable computing environment and is not intended to suggest any limitation as to the scope of use or functionality of the technology described herein. Neither should the computing device 700 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, an illustrative power supply 722, and a radio(s) 724. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 7 is merely illustrative of an exemplary computing device that can be used in connection with one or more aspects of the technology described herein. Distinction is not made between such categories as "workstation," "server," "laptop," and "handheld device," as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Exemplary memory includes solid-state memory, hard drives, and optical-disc drives. Computing device 700 includes one or more processors 714 that read data from various entities such as bus 710, memory 712, or I/O components 720. Presentation component(s) 716 present data indications to a user or other device. Exemplary presentation components 716 include a display device, speaker, printing component, and vibrating component. I/O port(s) 718 allow computing device 700 to be logically coupled to other devices including I/O components 720, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 714 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 700. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

A computing device may include radio(s) 724. The radio 724 transmits and receives radio communications. The computing device may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

What is claimed is:

1. A computer-implemented method comprising:

accessing, via a retriever component, smart contract code in a blockchain or a smart contract code repository for a smart contract, the smart contract code comprising conditions of the smart contract in a programming language format;

generating, by prompting a generative artificial intelligence (AI) language model fine-tuned based on at least one of a subject matter of the smart contract or a business related to the smart contract, natural language content based on the smart contract code, the natural language content comprising natural language descriptions of each of the conditions required for execution of the smart contract, wherein prompting the generative AI language model comprises:

generating, using chain-of-thought prompting, a set of prompts based on the conditions of the smart contract in the programming language format; and applying the set of prompts to the generative AI language model to generate the natural language content; and causing display, via a presentation component, of the natural language content, wherein the natural language content comprises a warning related to an off-chain condition of the smart contract code, the off-chain condition corresponding to one of the conditions of the smart contract required to be fulfilled outside a domain of the blockchain in order to execute the smart contract.

2. The computer-implemented method of claim 1, wherein the generative AI language model is trained using training data comprising corresponding smart contract code from a public blockchain and corresponding descriptions of the corresponding smart contract code from the public blockchain.

3. The computer-implemented method of claim 1, wherein the generative AI language model is a pre-trained language model, and the pre-trained language model is fine-tuned using Low Rank Adaptations (LoRA) by training the pre-trained language model based on training data related to at least one of the subject matter of the smart contract or the business related to the smart contract.

4. The computer-implemented method of claim 1, wherein the natural language content comprises a summary of the smart contract, the summary comprising (1) a purpose of the smart contract, (2) parties to the smart contract, (3) payment terms of the smart contract, (4) timeframes of the smart contract, (5) presence or absence of accompanying legal terms for the smart contract, (6) dispute resolution of the smart contract, (7) termination procedures of the smart contract; and (8) compliance requirements of the smart contract.

5. The computer-implemented method of claim 1, wherein the natural language content comprises a missing condition from the smart contract code based on a corresponding condition from a related smart contract in training data of the generative AI language model.

6. The computer-implemented method of claim 1, wherein the natural language content comprises suggested contract language based on the smart contract corresponding to natural language contract terms of a written contract instrument.

7. One or more non-transitory computer-readable media having a plurality of executable instructions embodied thereon, which, when executed by one or more processors, cause the one or more processors to perform a method comprising:

accessing, via a retriever component, smart contract code in a blockchain or a smart contract code repository for a smart contract, the smart contract code comprising conditions of the smart contract in a programming language format;

accessing, via the retriever component, terms accompanying the smart contract through smart contract metadata of the smart contract;

generating, by prompting a generative artificial intelligence (AI) language model fine-tuned based on at least one of a subject matter of the smart contract or a business related to the smart contract, natural language content based on the smart contract code and the terms accompanying the smart contract, the natural language content comprising natural language descriptions of each of the conditions required for execution of the smart contract, wherein prompting the generative AI language model comprises:

generating, using chain-of-thought prompting, a set of prompts based on the conditions of the smart contract in the programming language format; and applying the set of prompts to the generative AI language model to generate the natural language content; and causing display, via a presentation component, of the natural language content, wherein the natural language content comprises a missing condition from the smart contract code based on a corresponding condition from a related smart contract in training data of the generative AI language model.

8. The one or more non-transitory computer-readable media of claim 7, wherein the generative AI language model is trained using the training data comprising corresponding smart contract code from a public blockchain and corresponding descriptions of the corresponding smart contract code from the public blockchain.

9. The one or more non-transitory computer-readable media of claim 7, wherein the generative AI language model is a pre-trained language model, and the pre-trained language model is fine-tuned using Low Rank Adaptations (LoRA) by training the pre-trained language model based on corresponding training data related to at least one of the subject matter of the smart contract or the business related to the smart contract.

10. The one or more non-transitory computer-readable media of claim 7, wherein the natural language content comprises a summary of the smart contract, the summary comprising (1) a purpose of the smart contract, (2) parties to the smart contract, (3) payment terms of the smart contract, (4) timeframes of the smart contract, (5) presence or absence of accompanying legal terms for the smart contract, (6) dispute resolution of the smart contract, (7) termination procedures of the smart contract; and (8) compliance requirements of the smart contract.

11. The one or more non-transitory computer-readable media of claim 7, wherein the natural language content comprises a warning related to an off-chain condition of the smart contract code, the off-chain condition corresponding to one of the conditions of the smart contract required to be fulfilled outside a domain of the blockchain in order to execute the smart contract.

12. The one or more non-transitory computer-readable media of claim 7, wherein the natural language content comprises suggested contract language based on the smart contract code.

13. A computing system comprising:

a processor; and a non-transitory computer-readable medium having stored thereon instructions that when executed by the processor, cause the processor to perform operations including:

fine-tuning using Low Rank Adaptations (LoRA), via a fine-tuning component, a pre-trained generative artificial intelligence (AI) language model to generate natural language content based on smart contract code using training data related to at least one of a subject matter of a corresponding smart contract or a business related to the corresponding smart contract;

accessing, via a retriever component, corresponding smart contract code in a blockchain or a smart contract code repository for a smart contract, the corresponding smart contract code comprising conditions of the smart contract in a programming language format;

generating, by prompting the pre-trained generative AI language model as fine-tuned, corresponding natural language content based on the corresponding smart contract code, the natural language content comprising natural language descriptions of each of the conditions required for execution of the smart contract, wherein prompting the pre-trained generative AI language model comprises:

generating, using chain-of-thought prompting, a set of prompts based on the conditions of the smart contract in the programming language format; and applying the set of prompts to the pre-trained generative AI language model to generate the natural language content; and causing display, via a presentation component, of the corresponding natural language content, wherein the natural language content comprises a warning related to an off-chain condition of the smart contract code, the off-chain condition corresponding to one of the conditions of the smart contract required to be fulfilled outside a domain of the blockchain in order to execute the smart contract.

14. The computing system of claim 13, wherein the pre-trained generative AI language model is pre-trained using the training data comprising the smart contract code from a public blockchain and corresponding descriptions of the smart contract code from the public blockchain.

15. The computing system of claim 13, wherein the natural language content comprises a summary of the smart contract, the summary comprising (1) a purpose of the smart contract, (2) parties to the smart contract, (3) payment terms of the smart contract, (4) timeframes of the smart contract, (5) presence or absence of accompanying legal terms for the smart contract, (6) dispute resolution of the smart contract, (7) termination procedures of the smart contract; and (8) compliance requirements of the smart contract.

* * * * *